(12) United States Patent
Chowdhury et al.

(10) Patent No.: US 12,176,716 B2
(45) Date of Patent: Dec. 24, 2024

(54) LINE REACTOR PROTECTION SECURITY USING LOCAL FREQUENCY MEASUREMENT

(71) Applicant: Schweitzer Engineering Laboratories, Inc., Pullman, WA (US)

(72) Inventors: Ritwik Chowdhury, Charlotte, NC (US); Douglas I. Taylor, Spokane, WA (US); Normann Fischer, Colfax, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 18/459,691

(22) Filed: Sep. 1, 2023

(65) Prior Publication Data
US 2024/0097449 A1 Mar. 21, 2024

Related U.S. Application Data

(60) Provisional application No. 63/375,019, filed on Sep. 8, 2022.

(51) Int. Cl.
*H02J 3/24* (2006.01)
*H02H 7/22* (2006.01)
*H02J 3/00* (2006.01)
*H02J 3/01* (2006.01)

(52) U.S. Cl.
CPC ............ *H02J 3/241* (2020.01); *H02H 7/226* (2013.01); *H02J 3/0012* (2020.01); *H02J 3/00125* (2020.01); *H02J 3/01* (2013.01)

(58) Field of Classification Search
CPC ........ H02J 3/0012; H02J 3/00125; H02J 3/01; H02J 3/241; H02H 7/226
USPC ........................................................ 307/413
See application file for complete search history.

(56) References Cited

PUBLICATIONS

CIGRE WG B5.37 TB 546, "Protection, Monitoring and Control of Shunt Reactors," Aug. 2013.
B. Cook, C. Bolton, M. J. Thompson, and K. Garg, "SDG&E Relay Standards—Updating Tertiary Bus and Reactor Protection," proceedings of the 72nd Annual Conference for Protective Relay Engineers, College Station, TX, Mar. 2019.
IEEE STD C37.111-2013, Measuring relays and protection equipment—Part 24: Common format for transient data exchange (COMTRADE) for power systems, Edition 2.0, Apr. 2013.

*Primary Examiner* — Hal Kaplan
(74) *Attorney, Agent, or Firm* — Jared L. Cherry

(57) ABSTRACT

The present application discloses systems and methods related to protection of a reactor in an alternating current (AC) electric power system. In one embodiment, a system may include a protective action subsystem to implement a protective action based on identification of a fault condition associated with a reactor. A frequency determination subsystem may determine when a frequency of the AC voltage is outside of a range defined by a lower threshold and an upper threshold and may identify a change in the frequency associated with de-energization of a line in electrical communication with the reactor. A supervisory subsystem may restrain implementation of the protective action when the frequency is outside of the range or when the change in the frequency is associated with de-energization of the line in electrical communication with the reactor.

20 Claims, 6 Drawing Sheets

LINE REACTOR PROTECTION SECURITY USING LOCAL FREQUENCY MEASUREMENT

RELATED APPLICATION

The present application claims priority under 35 U.S.C. § 119 to U.S. Provisional Patent Application No. 63/375,019, titled LINE REACTOR PROTECTION DURING DE-ENERGIZATION RINGDOWN filed Sep. 8, 2022, which is incorporated by reference.

TECHNICAL FIELD

The present disclosure relates to systems and methods to protect line reactors in electrical systems using local measurements. More particularly but not exclusively, systems and methods consistent with the present application may consider line de-energization ringdown transient signals.

BRIEF DESCRIPTION OF THE DRAWINGS

Non-limiting and non-exhaustive embodiments of the disclosure are described, including various embodiments of the disclosure with reference to the figures, in which.

Figure 1C:
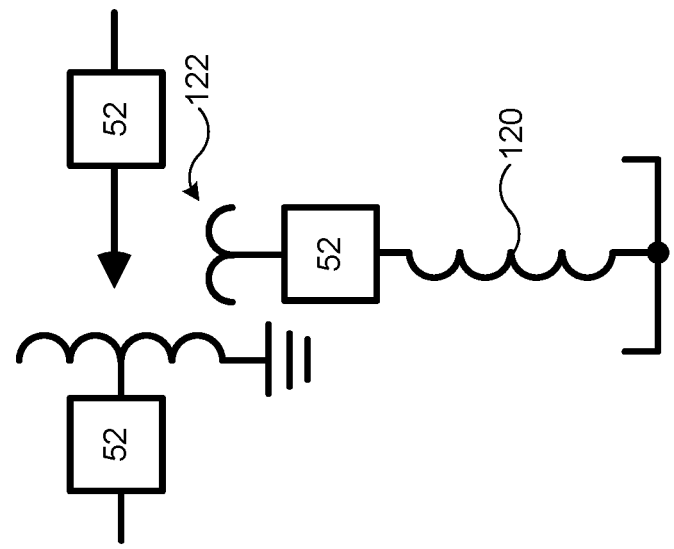
FIG. 1C illustrates a reactor coupled to a tertiary bus consistent with embodiments of the present disclosure.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Reference throughout this specification to "one embodiment" or "an embodiment" indicates that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and/or a product of a process.

The phrases "connected to," "networked," and "in communication with" refer to any form of interaction between two or more entities, including mechanical, electrical, magnetic, and electromagnetic interaction. Two components may be connected to each other, even though they are not in direct physical contact with each other and even though there may be intermediary devices between the two components.

Some of the infrastructure that can be used with embodiments disclosed herein are already available, such as: general-purpose computers, computer programming tools and techniques, digital storage media, and optical networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage device such as: non-volatile memory, static RAM, dynamic RAM, ROM, CD-ROM, disk, tape, magnetic, optical, flash memory, or other computer readable storage medium.

The described features, operations, or characteristics may be combined in any suitable manner in one or more embodiments. It will also be readily understood that the order of the steps or actions of the methods described in connection with the embodiments disclosed herein may be changed, as would be apparent to those skilled in the art. Thus, any order in the drawings or detailed description is for illustrative purposes only and is not meant to imply a required order, unless specified to require an order.

In the following description, numerous details are provided to give a thorough understanding of various embodiments. One skilled in the relevant art will recognize, however, that the embodiments disclosed herein can be practiced without one or more of the specific details, or with other methods, components, materials, etc. In other instances, well-known structures, materials, or operations are not shown or described in detail to avoid obscuring aspects of this disclosure.

Figure 1B:
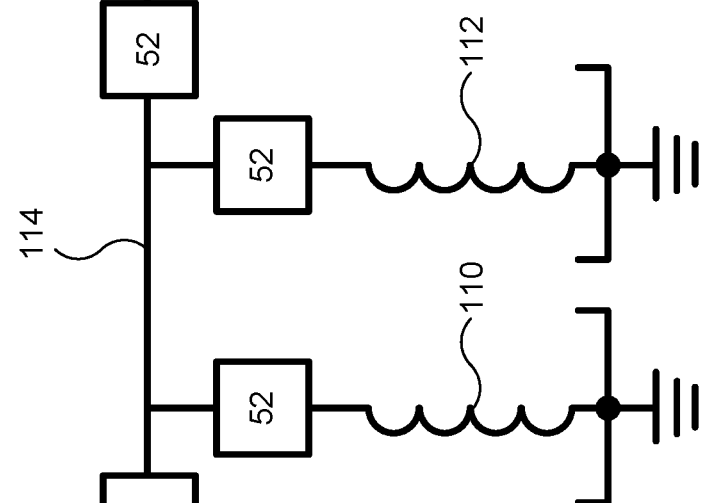
FIG. 1B illustrates a line-connected shunt reactor consistent with embodiments of the present disclosure.
Figure 1A:
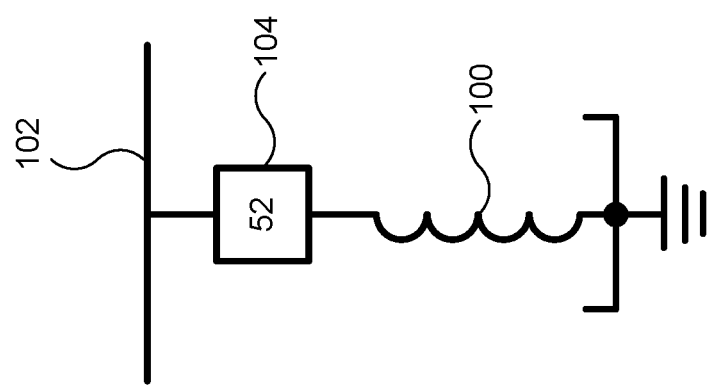
FIG. 1A illustrates a transmission or distribution bus-connected shunt reactor consistent with embodiments of the present disclosure.

FIG. 1A illustrates a transmission or distribution bus-connected shunt reactor 100 consistent with embodiments of the present disclosure. Reactor 100 may be electrically connected to a bus 102 through a breaker 104. A shunt reactor is a coil wired between two points in a power system to reduce the phase voltage magnitude. As illustrated in FIG. 1A, a bus-connected reactor in a transmission or distribution system may be connected from phase to ground to mitigate phase overvoltage conditions. Reactors are commonly one of two types, namely air-core reactors and gapped iron-core reactors. Typically, air-core reactors are dry-type and iron-core reactors are oil-immersed in a tank.

FIG. 1B illustrates a line-connected shunt reactor consistent with embodiments of the present disclosure. The illustrated embodiment includes a first reactor 110 and a second reactor 112 on the two ends of a line 114. Line-connected shunt reactors may compensate for a capacitive charging current in long lines to mitigate overvoltage during light loads. Line-connected shunt reactors are commonly used to compensate 70% to 80% of the capacitive charging current in long lines.

FIG. 1C illustrates a reactor 120 coupled to a transformer tertiary bus 122 consistent with embodiments of the present disclosure. Reactors on the transformer tertiary bus 122 may be ungrounded and provide a convenient place to provide voltage regulation. As one of skill in the art will appreciate, the systems and method disclosed herein may be applied to the various reactor configurations illustrated in FIG. 1A, FIG. 1B, and FIG. 1C.

Reactors may experience various types of faults, including phase-to-phase faults, ground faults, and turn faults. Air-core reactor phases are separated in space significantly and typically have adequate insulation to ground; therefore, the likelihood of phase-to-phase and ground faults is low. Iron-core reactors are oil-immersed and face a greater likelihood of a ground or a phase-to-phase fault due to the proximity of the core to the tank and the proximity of phase windings to one another, respectively. Turn faults can occur in both air-core reactors and iron-core reactors. In air-core reactors, because of the low probability of phase and ground faults, turn faults are by far the most likely fault type.

When a transmission line is de-energized, there is a ringdown phenomenon in which the distributed capacitance of the line exchanges energy with the line reactors. With the power system disconnected, the natural ringdown frequency ($f_{LC}$) of this oscillation can be approximated by a shunt capacitive reactance ($X_C$) and a shunt inductive reactance ($X_L$) of the line using Eq. 1.

$$f_{LC} = f_{SYS}\sqrt{\frac{X_C}{X_L}} = f_{SYS}\sqrt{\frac{MVAR_L}{MVAR_C}} \quad \text{Eq. 1}$$

For example, if a line reactor is sized to compensate 75% of the capacitive reactance at a system frequency ($f_{SYS}$) of 60 Hz, then $f_{LC}$ evaluates to 52 Hz, as shown in Eq. 2.

$$f_{LC}=60 \text{ Hz}\cdot\sqrt{0.75}=52 \text{ Hz} \quad \text{Eq. 2}$$

When a line is de-energized after a fault, the voltages on the faulted phases are depressed and the associated reactor phase currents may be lower. The depressed voltages may be less than thresholds set by a protection system; however, when the line is de-energized without a fault, the phase voltages and currents may increase because there is a step-change in frequency from $f_{SYS}$ to $f_{LC}$. The energy stored in the capacitance and the inductance is at the nominal frequency (e.g., 60 Hz). Then when the line gets disconnected, there is an energy exchange between the capacitor and inductor at their resonant frequency ($f_{LC}$). The voltage and current can increase or decrease depending on whether $f_{LC}$ is higher or lower than the nominal frequency. Normally, power system frequencies ramp because of system inertia, according to the swing equation. Relays are typically designed to assume this power system characteristic of frequency ramps. The frequency step-change during line reactor de-energization can result in phasor estimation errors and cause a misoperation of a turn fault protection scheme.

In some embodiments, a system may be configured to differentiate between a frequency ramp and a step-change. In such embodiments, the frequency tracking algorithm may respond appropriately to both a frequency step-change caused by line de-energization and to a frequency ramp.

To provide security during ringdown (following normal line de-energization), one option is the use of line breaker statuses to block protection. If only the local line terminal breaker status is used, then the scheme can lose dependability when the line is energized from a remote terminal. In contrast, relying on breaker status information from a remote terminal introduce a communications channel requirement. The protection scheme can be degraded due to a loss of the channel, consideration of channel latency, and possible reduced reliability of breaker statuses.

Figure 2A:
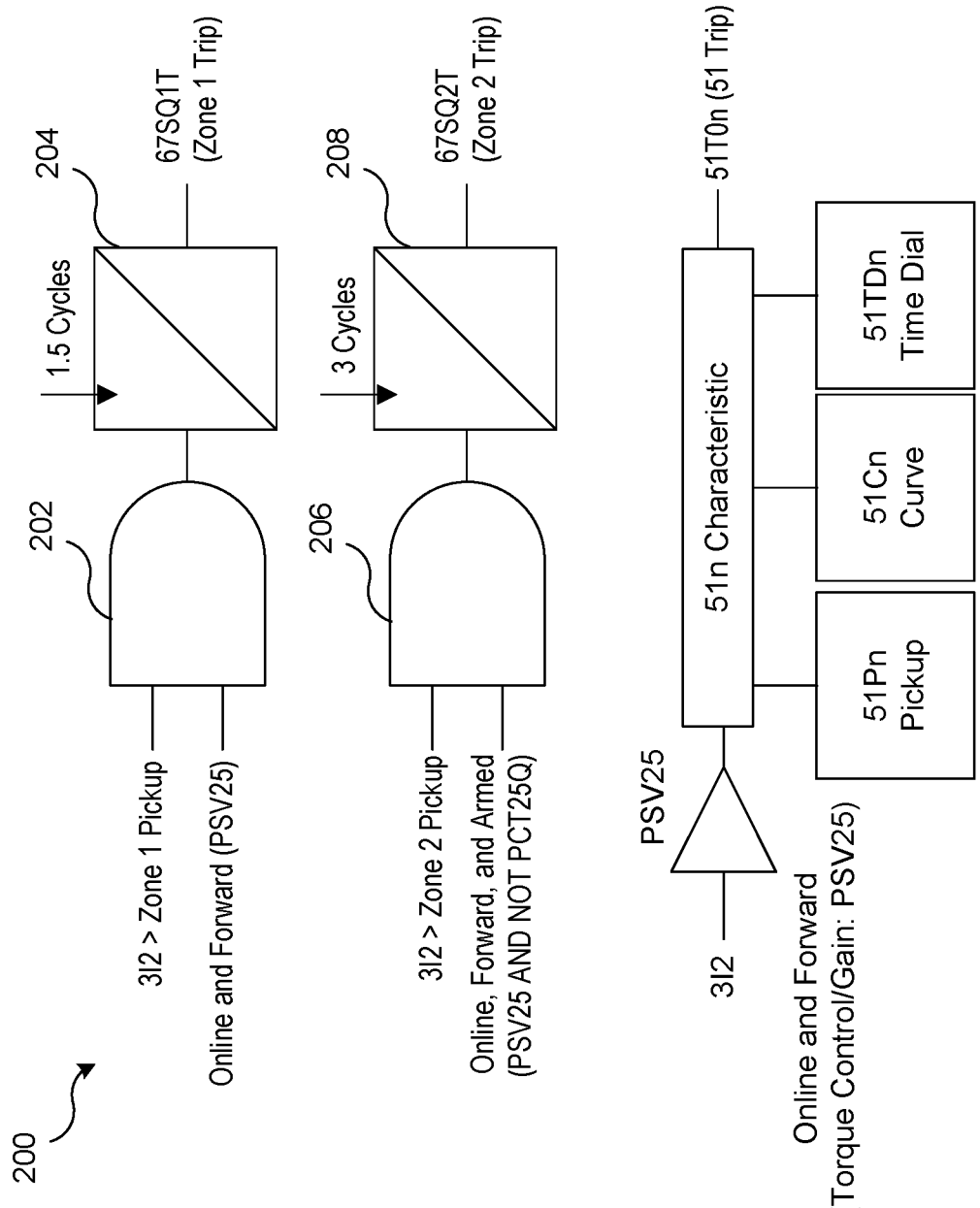
FIG. 2A illustrates a plurality of simplified logic diagrams that may be utilized in a turn fault protection scheme for a first zone and a second zone consistent with embodiments of the present disclosure.

FIG. 2A illustrates a plurality of simplified logic diagrams 200 that may be utilized in a turn fault protection scheme for a first zone, a second zone, and a time overcurrent characteristic consistent with embodiments of the present disclosure. A turn fault protection scheme may be designed for security, sensitivity, and speed. The basic principle is that the overcurrent element or other supervisory logic is set to remain secure for CT saturation, whereas the directional element provides security for external events.

The operating principle of a turn fault protection scheme utilizing the plurality of simplified logic diagrams 200 may include certain features. For example, Zone 1 may provide fast protection and may always be enabled. A Zone 1 pickup value may set above the worst-case CT saturation, reactor inrush, and reactor unbalance. A first input of AND gate 202 may assert when a negative-sequence current (312) is greater than a Zone 1 pickup threshold. An online and forward signal is described below in connection with FIG. 2B. An output of AND gate 202 may be an input to a timer 204. A time requirement (e.g., 1.5 cycles in the illustrated embodiment) may be established before an output of timer 204 is asserted and a trip signal is generated for Zone 1.

A trip signal for Zone 2 may be generated by AND gate 206 and timer 208. Again, a first input of AND gate 206 may assert when the negative-sequence current (312) is greater than a Zone 2 pickup threshold. In one specific embodiment, Zone 2 may be set with a 312 value of 6% (10 or 12 of 2%), which provides a 73% security margin over a maximum reactor unbalance of 1.15%. Security for Zone 2 may be primarily achieved from an arming delay, which in some embodiments may enable the scheme 10 to 30 seconds after the reactor is energized or after an external event. The signal "Armed" may be utilized to enable the system after a specified time or under specified conditions.

A neutral time overcurrent element (51n) may also be provided. The neutral time overcurrent element (51n) may operate slowly, but it may be active at all times, just like Zone 1, and remains dependable when Zone 2 is disarmed. A pickup and time dial may be set to coordinate with the worst-case errors associated with CT saturation and reactor inrush.

Figure 2B:
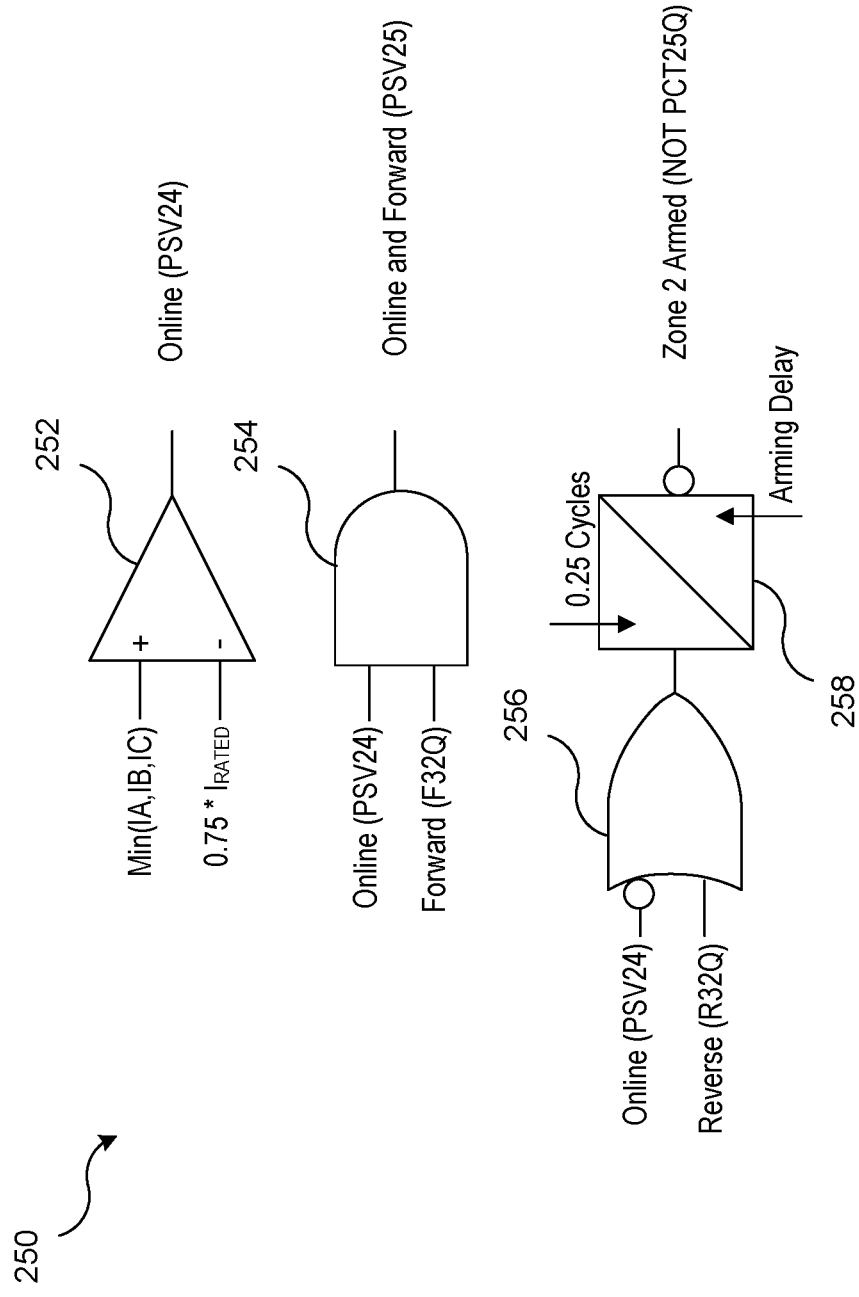
FIG. 2B illustrates a plurality of simplified logic diagrams that may be utilized to supervise the plurality of simplified logic diagrams illustrated in FIG. 2A and consistent with the present disclosure.

FIG. 2B illustrates a plurality of simplified logic diagrams 250 that may be utilized to supervise the plurality of simplified logic diagrams 200 illustrated in FIG. 2A and consistent with the present disclosure. A comparator 252 may determine if a minimum phase current ($I_A$, $I_B$, $I_C$) is greater than 75% of the shunt reactor current ($I_{RATED}$), and an online signal (PSV24) may be generated. The online signal (PSV24) may be a first input to AND gate 254. A second input to AND gate 254 may be a forward directional signal. When the two inputs of AND gate 254 are asserted, an online and forward signal (PSV25) may be asserted. An OR gate 256 may receive the online signal (PSV24) and a reverse signal from a reverse directional power relay (R32Q). The output of OR gate 256 may be asserted if the online (PSV24) signal is deasserted or if the reverse directional power relay (R32Q) is asserted. The output of OR gate 256 is an input to a timer 258, which may assert after 0.25 cycles. Once asserted, it would only be allowed to deassert after an arming delay (e.g., 10 or 30 seconds). The inverse of the output of timer 258 may generate the Zone 2 Armed (NOT PCT25Q) signal used as an input to AND gate 206.

The supervisory logic illustrated in FIG. 2B ensures that the scheme can only trip when a reactor is online (PSV24). A pickup of 75% of a rated current of the reactor ($I_{RATED}$) has adequate dependability margin for system undervoltage conditions. A three-phase overcurrent scheme remains dependable for high-magnitude turn faults. This supervision also adds security for a breaker open pole due to pole-scatter during energization or because a pole is stuck. The supervisory logic uses the same currents required for a 3I2 calculation to confirm measurement validity, including a CT failure. The supervisory logic only responds to reactor internal/forward faults based on a forward directional element declaration (F32Q), which ensures security for any external events. Further, the arming delay may be selected based on a particular application. For example, a 10-second arming delay may be utilized for solidly grounded iron-core reactors with the primary system X/R ratio of approximately 2 seconds. In another example, a 30-second arming delay may be used for ungrounded reactor banks where 3I2 is used because the errors can last longer and are associated with the time constants of CTs, which can be approximately 10 seconds for closed-core CTs. The specific settings may be confirmed and customized during commissioning of a system and, if additional security is warranted, thresholds of pickups and time delays may be increased.

Figure 3:
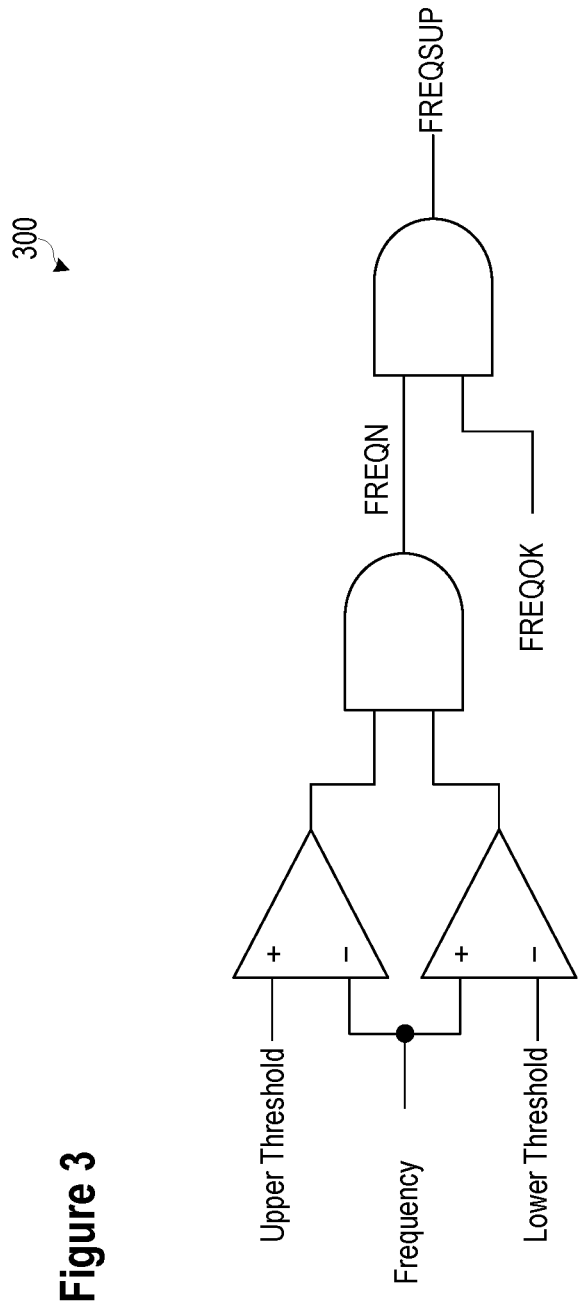
FIG. 3 illustrates a simplified logic diagram for frequency supervision of a line reactor turn fault protection system consistent with embodiments of the present disclosure.

FIG. 3 illustrates a simplified logic diagram 300 for frequency supervision of a line reactor turn fault protection system consistent with embodiments of the present disclosure. When a sudden frequency change occurs (e.g., a step-change in frequency from $f_{SYS}$ to $f_{LC}$), the healthy frequency indication (FREQOK) in the relay deasserts. In some embodiments, the healthy frequency indication signal may deassert quickly and well before the shortest pickup time delay of 1.5 cycles. After the frequency measurement (FREQ) is restored and FREQOK asserts, the relay accurately tracks $f_{LC}$.

The output of simplified logic diagram 300 (FREQSUP) can be used to supervise other elements and to provide security during unreliable frequency measurement (i.e., when FREQOK is deasserted). The frequency input may be calculated from the measured voltages. If the voltage transformers (VTs) measure voltages at the reactor terminals, the FREQSUP logic using FREQOK may require a few cycles to assert, which can delay a turn fault protection trip during a reactor switch-on-to-fault scenario. Therefore, in some embodiments, line VTs (on the line-side of the reactor breaker) may be utilized.

The output of simplified logic diagram 300 may also secure a reactor protection scheme when $f_{LC}$ is outside 2% of the system nominal frequency. In applications where the reactor is sized to compensate within 95% to 105% of the capacitive reactance, $f_{LC}$ may be within 2% of the system nominal frequency. In such cases, the ringdown during line de-energization may be relatively smooth, and as such, the turn fault protection scheme may be sufficiently secure.

Figure 4:
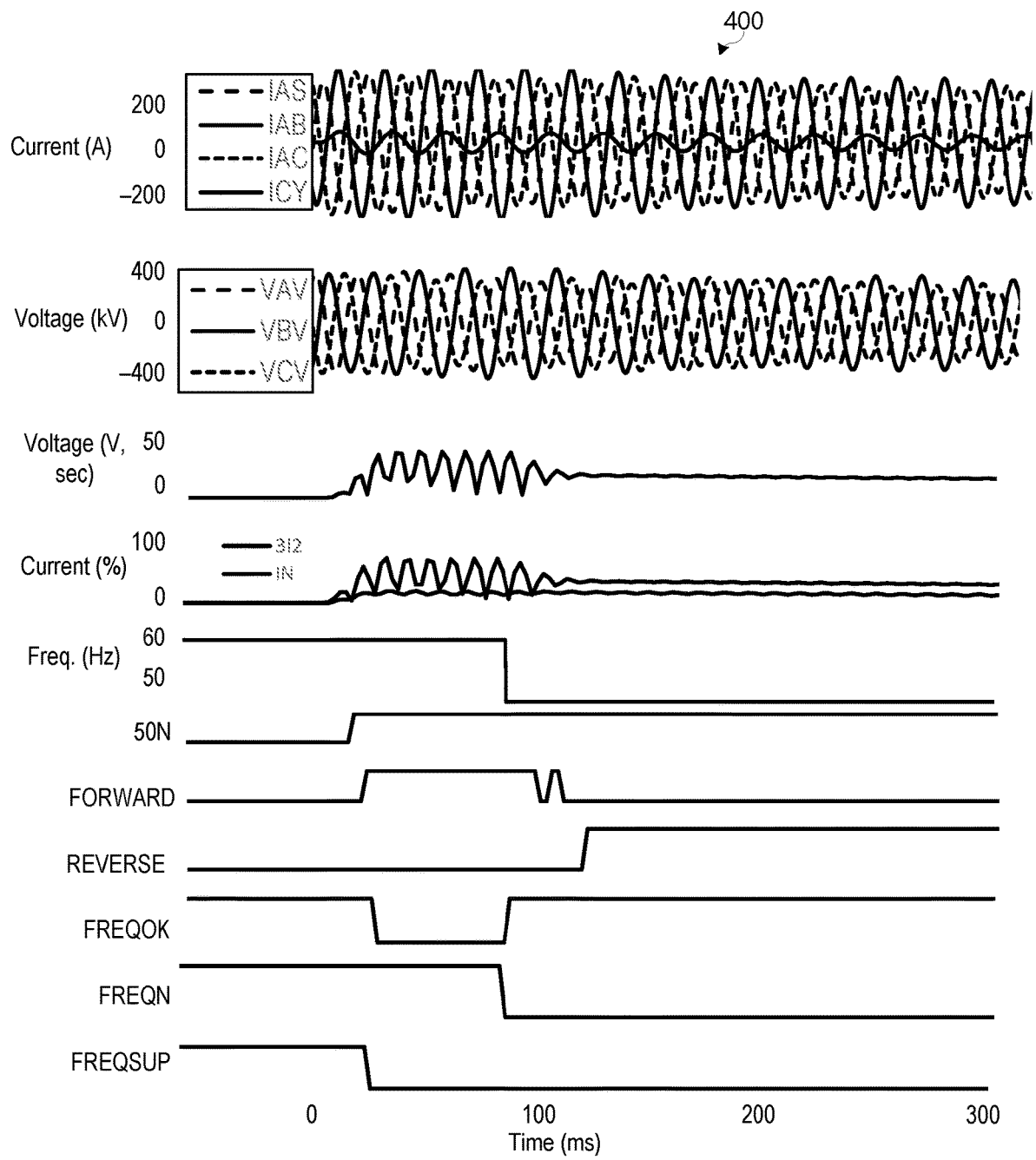
FIG. 4 illustrates a plurality of plots of electrical parameters during a line de-energization consistent with embodiments of the present application.

FIG. 4 illustrates a plurality of plots of electrical parameters 400 during a line de-energization consistent with embodiments of the present application. The last line breaker is opened at t=0. Because the three-poles of the breaker do not open at the same time and because of the difference between $f_{LC}$ and $f_{SYS}$, there is an unbalance in the circuit that develops and appears as a current in the neutral of the shunt reactor. A relay continues to incorrectly track the system frequency of 60 Hz for some time, and this results in erroneous phasor estimation, as evident from the high magnitude ripple in the 3V2 and 3I2. Even though the unbalanced condition (at a frequency of $f_{LC}$) is in a reverse direction, the relay identifies it in the forward direction because of the phasor estimation error. A FREQOK signal is unasserted for a quarter cycle after a FORWARD signal is asserted, so using FREQSUP that considers FREQOK ensures that the turn fault protection scheme remains secure.

At approximately 80 milliseconds, the FREQOK signal asserts and the relay tracks the frequency to $f_{LC}$ of approximately 52 Hz. A FREQN signal that signifies that the frequency is within 2 percent of the nominal frequency is unasserted to provide security. After a filter transients, the phasors stabilize and the directional element identifies the imbalance in the reverse direction and the REVERSE signal asserts. During the ringdown, FREQSUP remains unasserted, either due to a deassertion of FREQOK or FREQN, and adds security to line reactor turn fault protection.

Figure 5:
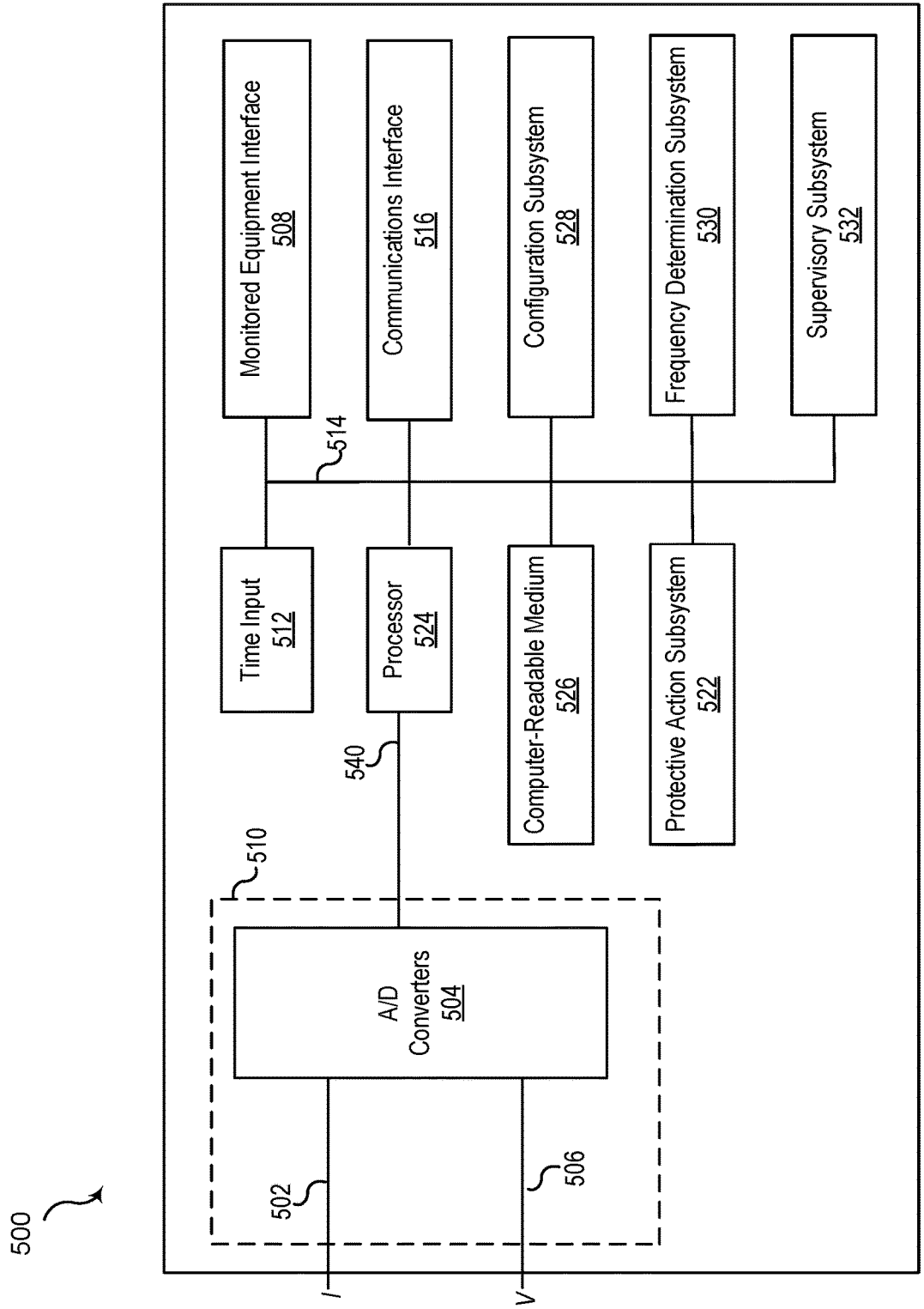
FIG. 5 illustrates a functional block diagram of a system to protect line reactors in electrical systems using local measurements consistent with embodiments of the present disclosure.

FIG. 5 illustrates a functional block diagram of a system 500 to protect line reactors in electrical systems using local measurements consistent with embodiments of the present disclosure. System 500 may be implemented using hardware, software, firmware, and/or any combination thereof. In some embodiments, system 500 may be embodied as an IED, a protective relay, or other type of device. Certain components or functions described herein may be associated with other devices or performed by other devices. The specifically illustrated configuration is merely representative of one embodiment consistent with the present disclosure.

System 500 includes a communications interface 516 to communicate with relays, IEDs, and/or other devices. In certain embodiments, the communications interface 516 may facilitate direct communication or communicate with systems over a communications network (not shown). System 500 may further include a time input 512, which may be used to receive a time signal (e.g., a common time reference) allowing system 500 to apply a time-stamp to acquired samples. In certain embodiments, a common time reference may be received via communications interface 516, and accordingly, a separate time input may not be required for time-stamping and/or synchronization operations. One such embodiment may employ the IEEE 1588 protocol. A monitored equipment interface 508 may receive status information from, and issue control instructions or protective actions to, a piece of monitored equipment (e.g., a circuit breaker, conductor, transformer, or the like).

Processor 524 processes communications received via communications interface 516, time input 512, and/or monitored equipment interface 508. Processor 524 may operate using any number of processing rates and architectures. Processor 524 may perform various algorithms and calculations described herein. Processor 524 may be embodied as a general-purpose integrated circuit, an application-specific integrated circuit, a field-programmable gate array, and/or any other suitable programmable logic device. A data bus 514 may provide connection between various components of system 500. A configuration subsystem 528 may allow an operator to configure various aspects of system 500, including criteria related to thresholds or parameters described above.

Instructions to be executed by processor 524 may be stored in computer-readable medium 526. Computer-readable medium 526 may comprise random access memory (RAM) and non-transitory memory. Computer-readable medium 526 may be the repository of software modules configured to implement the functionality described herein.

System 500 may include a sensor component 510. In the illustrated embodiment, sensor component 510 may receive current measurements 502 and/or voltage measurements 506. The sensor component 510 may comprise A/D converters 504 that sample and/or digitize filtered waveforms to form corresponding digitized current and voltage signals. Current measurements 502 and/or voltage measurements 506 may include separate signals from each phase of a three-phase electric power system. A/D converters 504 may be connected to processor 524 by way of data bus 540, through which digitized representations of current and voltage signals may be transmitted.

A protective action subsystem 522 may implement a protective action based on various conditions monitored by system 500. In various embodiments, a protective action may include tripping a breaker, selectively isolating or disconnecting a reactor or other portion of the electric power system, etc. More specifically, protective action subsystem 522 may implement a protective action based on identification of a fault condition associated with a reactor in the alternating current electric power system. Protective action subsystem 522 may implement a protective action in response to various conditions, including a turn-to-turn fault in a reactor.

A frequency determination subsystem 530 may be configured to monitor the frequency of an alternating current electric power system. Frequency determination subsystem 530 may determine deviations from a nominal frequency (e.g., 60 Hz) and may implement actions if the frequency deviates from the nominal frequency. In one specific embodiment, frequency determination subsystem 530 may determine whether the frequency exceeds a lower threshold and is below an upper threshold. The lower threshold and the upper threshold may be selected based on the parameters of a particular system. In one specific embodiment, the lower threshold may be approximately 98% of the nominal frequency, and the upper threshold may be approximately 102% of the nominal frequency.

A supervisory subsystem 532 may be configured to restrain protective action subsystem 522 based on various conditions. Supervisory subsystem 532 may restrain protective action subsystem 522 if the frequency determined by frequency determination subsystem 530 is above an upper threshold or below a lower threshold. In some embodiments, the lower threshold range may be between approximately 80 to 99.5%, and the upper frequency range may be between 100.5% to 120%. An operator may select specific thresholds based on various criteria. For example, in an application with a 75% compensated line with a natural frequency of 52 Hz, an operator could set the threshold at 54 Hz to bias toward dependability. Alternatively, an operator may bias toward security by setting the threshold at a higher level (e.g., 99.5% or even 99.9%).

Further, supervisory subsystem 532 may restrain implementation of a protective action based on a change in the frequency associated with de-energization of a line in electrical communication with a reactor. As explained above, de-energization may cause a rapid change in the frequency based on the natural ringdown frequency of the system. A transition from a frequency near the nominal frequency to the natural ringdown frequency may cause supervisory subsystem 532 to restrain protective action by protective action subsystem 522.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed:

1. A system configured to protect a reactor in an alternating current electric power system, the system comprising:
    a protective action subsystem to implement a protective action based on identification of a fault condition associated with a reactor in the alternating current electric power system;
    a frequency determination subsystem to:
        determine when a frequency of the alternating current exceeds a lower threshold and is below an upper threshold;
        identify a change in the frequency associated with de-energization of a line in electrical communication with the reactor;
    a supervisory subsystem configured to restrain implementation of the protective action when:
        the frequency determined by the frequency determination subsystem is below the lower threshold;
        the frequency determined by the frequency determination subsystem is above the upper threshold; or
        the change in the frequency determined by the frequency determination subsystem is associated with de-energization of the line in electrical communication with the reactor.

2. The system of claim 1, wherein the lower threshold is approximately 98% of a nominal frequency of the alternating current electric power system and the upper threshold is approximately 102% of the nominal frequency of the alternating current electric power system.

3. The system of claim 1, wherein the protective action subsystem comprises an overcurrent element.

4. The system of claim 3, wherein the overcurrent element is configured to detect a turn-to-turn fault in the reactor.

5. The system of claim 1, wherein the change in frequency approximately corresponds to a natural ringdown frequency.

6. The system of claim 5, wherein the natural ringdown frequency corresponds to the level of compensation provided by the shunt reactor, calculated based on a ratio of a shunt capacitive reactance of the line and a shunt inductive reactance of the reactor.

7. The system of claim 1, wherein the supervisory subsystem is further configured to operate in the absence of a communication channel with a remote terminal of the line in electrical communication with the reactor.

8. The system of claim 1, wherein the supervisory subsystem is further configured to restrain implementation of the protective action based on an input from a directional overcurrent element.

9. The system of claim 1, wherein the frequency determination subsystem is further configured to differentiate between a frequency ramp and the change in the frequency associated with de-energization of the line in electrical communication with the reactor.

10. The system of claim 1, wherein the supervisory subsystem is further configured to restrain the protective action based on an arming delay.

11. The system of claim 1, further comprising, restraining, using the supervisory subsystem, the protective action based on an arming delay.

12. A method for protecting a reactor in an alternating current electric power system, the method comprising:
    implementing, using a protective action subsystem, a protective action based on identification of a fault condition associated with a reactor in the alternating current electric power system;

determining, using a frequency determination subsystem that a frequency of the alternating current exceeds a lower threshold and is below an upper threshold;

identifying, using the frequency determination subsystem, a change in the frequency associated with de-energization of a line in electrical communication with the reactor;

restraining, using a supervisory subsystem, implementation of the protective action when:

the frequency determined by the frequency determination subsystem is below the lower threshold;

the frequency determined by the frequency determination subsystem is above the upper threshold; or the change in the frequency determined by the frequency determination subsystem is associated with de-energization of the line in electrical communication with the reactor.

13. The method of claim 12, wherein the lower threshold is approximately 98% of a nominal frequency of the alternating current electric power system and the upper threshold is approximately 102% of the nominal frequency of the alternating current electric power system.

14. The method of claim 12, wherein the protective action subsystem comprises an overcurrent element.

15. The method of claim 14, wherein the overcurrent element is configured to monitor for a turn-to-turn fault in the reactor.

16. The method of claim 12, wherein the change in frequency approximately corresponds to a natural ringdown frequency.

17. The method of claim 16, wherein the natural ringdown frequency corresponds to the level of compensation provided by the shunt reactor, calculated based on a ratio of a shunt capacitive reactance of the line and a shunt inductive reactance of the reactor.

18. The method of claim 12, wherein the supervisory subsystem is further configured to operate in the absence of a communication channel with a remote terminal of the line in electrical communication with the reactor.

19. The method of claim 12, wherein the supervisory subsystem is further configured to restrain implementation of the protective action based on a directional power element.

20. The method of claim 12, further comprising, differentiating, using the frequency determination subsystem, between a frequency ramp and the change in the frequency associated with de-energization of the line in electrical communication with the reactor.

* * * * *